US012125379B2

(12) United States Patent
Tong et al.

(10) Patent No.: US 12,125,379 B2
(45) Date of Patent: Oct. 22, 2024

(54) METHOD AND SYSTEM FOR VALIDATING AUTONOMOUS VEHICLE PERFORMANCE USING NEARBY TRAFFIC PATTERNS

(71) Applicant: GM Global Technology Operations LLC, Detroit, MI (US)

(72) Inventors: Wei Tong, Troy, MI (US); Shige Wang, Northville, MI (US); Shuqing Zeng, Sterling Heights, MI (US); Sourav Dey, South Lyon, MI (US); Xiaofeng Frank Song, Novi, MI (US); Upali P. Mudalige, Rochester Hills, MI (US); Praveen Choudhury, Farmington Hills, MI (US)

(*) Notice: Subject to any disclaimer, the term of this patent is extended or adjusted under 35 U.S.C. 154(b) by 261 days.

(21) Appl. No.: 17/725,814

(22) Filed: Apr. 21, 2022

(65) Prior Publication Data

US 2023/0343210 A1 Oct. 26, 2023

(51) Int. Cl.
*G08G 1/01* (2006.01)

(52) U.S. Cl.
CPC ......... *G08G 1/0145* (2013.01); *G08G 1/0133* (2013.01); *G08G 1/0141* (2013.01)

(58) Field of Classification Search
CPC .. G08G 1/0145; G08G 1/0133; G08G 1/0141; G08G 1/0112
See application file for complete search history.

(56) References Cited

U.S. PATENT DOCUMENTS

2008/0312833 A1* 12/2008 Greene .................. G08G 1/165 701/301
2016/0304092 A1* 10/2016 Rebhan ................. B60W 30/16
2020/0377123 A1* 12/2020 Smith ..................... H04L 67/12
2020/0408517 A1* 12/2020 Max ....................... G07C 5/008
2022/0415180 A1* 12/2022 Zegelaar .................. G08G 1/22

OTHER PUBLICATIONS

"Polynomial—Wikipedia" Downloaded from the Wayback Machine Jul. 19, 2018 (Year: 2018).*
"Inverse Distance Weighing—Wikipedia" Downloaded from the Wayback Machine Apr. 8, 2021 (Year: 2021).*
"Object detection for automotive radar point clouds—a comparison" by N. Scheiner et al. AI Perspectives (2021) 3:6 (Year: 2021).*

* cited by examiner

*Primary Examiner* — Peter D Nolan
*Assistant Examiner* — Tanya C Sienko
(74) *Attorney, Agent, or Firm* — Vivacqua Crane, PLLC

(57) ABSTRACT

A method for validating an autonomous vehicle performance using nearby traffic patterns includes receiving remote vehicle data. The remote vehicle data includes at least one remote-vehicle motion parameter about a movement of a plurality of remote vehicles during a predetermined time interval. The method further includes determining a traffic pattern of the plurality of remote vehicles using the at least one remote-vehicle motion parameter. The method includes determining a similarity between the traffic pattern of the plurality of remote vehicles and movements of the host vehicle. Further, the method includes determining whether the similarity between the traffic pattern of the plurality of remote vehicles and movements of the host vehicle is less than a predetermined threshold. Also, the method includes commanding the host vehicle to adjust the movements thereof to match the traffic pattern of the plurality of remote vehicles.

16 Claims, 2 Drawing Sheets

METHOD AND SYSTEM FOR VALIDATING AUTONOMOUS VEHICLE PERFORMANCE USING NEARBY TRAFFIC PATTERNS

INTRODUCTION

The present disclosure relates to a system and method for validating autonomous vehicle performance using nearby traffic patterns.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Validating autonomous driving performance is a very challenging task. Besides the long-tail problem (i.e., large number of corner cases), another problem is the lack of ground truth. This is mainly because in most driving scenarios, there might exist many equally good decisions/plans. Therefore, it is challenging to define which one is the ground truth that should be used for validating autonomous driving system performance. It is therefore desirable to develop a system and method for validating autonomous vehicle performance.

SUMMARY

The presently disclosed system and method may be used to validate autonomous driving performance. In most autonomous driving scenarios, the behavior of the host vehicle should be consistent with the rest in the traffic flow. Therefore, the overall surrounding traffic flow patterns are used as the ground truth to validate the autonomous driving performance of the host vehicle.

The present disclosure describes a method for validating an autonomous vehicle performance using nearby traffic patterns. In an aspect of the present disclosure, the method includes receiving remote vehicle data. The remote vehicle data includes at least one remote-vehicle motion parameter about a movement of each of a plurality of remote vehicles during a predetermined time interval (e.g., four minutes). Each of the plurality of remote vehicles is located at a predetermined distance (e.g., six meters) from a host vehicle. The method further includes determining a traffic pattern of the plurality of remote vehicles using at least one remote-vehicle motion parameter of each of the plurality of remote vehicles during the predetermined time interval. Also, the method includes determining a similarity between the traffic pattern of the plurality of remote vehicles and movements of the host vehicle. Further, the method includes determining whether the similarity between the traffic pattern of the plurality of remote vehicles and movements of the host vehicle is less than a predetermined threshold. The method also includes commanding the host vehicle to adjust the movements thereof to match the traffic pattern of the plurality of remote vehicles in response to determining that the similarity between the traffic pattern of the plurality of remote vehicles and the movements of the host vehicle is less than the predetermined threshold. The method described in this paragraph improves vehicle technology by making sure that a host vehicle drives autonomously in accordance with the nearby traffic pattern.

In an aspect of the present disclosure, the method includes sensing objects around the host vehicle.

In an aspect of the present disclosure, the method further includes identifying the objects that were previously sensed and that are located at the predetermined distance from the host vehicle during a predetermined time interval.

In an aspect of the present disclosure, the method further includes tracking the objects that were previously sensed and that are located at the predetermined distance from the host vehicle during a predetermined time interval.

In an aspect of the present disclosure, the method further includes determining object parameters for each of the objects that are being tracked. The object parameters include an object identification number, an observed trajectory, a class, a predicted trajectory, a longitudinal velocity profile during the predetermined time interval, a lateral velocity profile during the predetermined time interval, an angular velocity profile during the predetermined time interval, an average longitudinal velocity during the predetermined time interval, an average lateral velocity during the predetermined time interval, and an average angular velocity during the predetermined time interval, and the class includes a pedestrian, a motor vehicle, and infrastructure.

In an aspect of the present disclosure, the plurality of remote-vehicle motion parameters include the longitudinal velocity profile during the predetermined time interval of each of the plurality of remote vehicles, the lateral velocity profile during the predetermined time interval of each of the plurality of remote vehicles, the angular velocity profile during the predetermined time interval of each of the plurality of remote vehicles, the average longitudinal velocity during the predetermined time interval, the average lateral velocity during the predetermined time interval of each of the plurality of remote vehicles, and the average angular velocity during the predetermined time interval.

In an aspect of the present disclosure, the method includes determining a weighted mean of each of the plurality of remote-vehicle motion parameters of each of the plurality of remote vehicles using a following equation:

$$meanP=\Sigma w^i p^i$$

where:

$w^i$ is a gaussian weighting factor that is indirectly proportional to a distance from one of the plurality of remote vehicles to the host vehicle;

i is one of the plurality of remote vehicles; and $p^i$ is one of the plurality of remote-vehicle motion parameters for remote vehicle i; and meanP is a weighted mean of one of the plurality of remote-vehicle motion parameters.

The present disclosure describes a system for validating an autonomous vehicle performance using nearby traffic patterns. In an aspect of the present disclosure, the system includes a plurality of sensors and a controller in communication with the plurality of sensors. The controller is programmed to receive remote vehicle data from the plurality of sensors. The remote vehicle data includes at least one remote-vehicle motion parameter about a movement of each of a plurality of remote vehicles during a predetermined time interval, and each of the plurality of remote vehicles is located at a predetermined distance from a host vehicle. The controller is also programmed to determine a traffic pattern of the plurality of remote vehicles using at least one remote-vehicle motion parameter of each of the plurality of remote vehicles during the predetermined time interval. Further, the controller is programmed to determine a similarity between the traffic pattern of the plurality of remote vehicles and movements of the host vehicle. The controller is programmed to determine whether the similarity between the traffic pattern of the plurality of remote vehicles and movements of the host vehicle is less than a predetermined threshold. The controller is programmed to command the host vehicle to adjust the movements thereof to match the traffic pattern of the plurality of remote vehicles in response to determining that the similarity between the traffic pattern of the plurality of remote vehicles and movements of the host vehicle is less than a predetermined threshold. The system described in this paragraph improves vehicle technology by making sure that a host vehicle drives autonomously in accordance with the nearby traffic pattern.

In an aspect of the present disclosure, each of the plurality of sensors is configured to sense objects around the host vehicle.

In an aspect of the present disclosure, the controller is configured to identify the objects that were previously sensed and that are located at the predetermined distance from the host vehicle during a predetermined time interval.

In an aspect of the present disclosure, the controller is configured to track the objects that were previously sensed and that are located at the predetermined distance from the host vehicle during a predetermined time interval.

In an aspect of the present disclosure, the controller is programed to determine object parameters for each of the objects that are being tracked. The object parameters include an object identification number, an observed trajectory, a class, a predicted trajectory, a longitudinal velocity profile during the predetermined time interval, a lateral velocity profile during the predetermined time interval, an angular velocity profile during the predetermined time interval, an average longitudinal velocity during the predetermined time interval, an average lateral velocity during the predetermined time interval, an average angular velocity during the predetermined time interval, and the class includes a pedestrian, a motor vehicle, and infrastructure.

In an aspect of the present disclosure, the plurality of remote-vehicle motion parameters include a longitudinal velocity profile during the predetermined time interval of each of the plurality of remote vehicles, a lateral velocity profile during the predetermined time interval of each of the plurality of remote vehicles, an angular velocity profile during the predetermined time interval of each of the plurality of remote vehicles, an average longitudinal velocity during the predetermined time interval, an average lateral velocity during the predetermined time interval of each of the plurality of remote vehicles, and an average angular velocity during the predetermined time interval.

In an aspect of the present disclosure, the controller is programmed to determine the traffic pattern of the plurality of remote vehicles of includes determining a weighted mean of each of the plurality of remote-vehicle motion parameters of each of the plurality of remote vehicles using the following equation:

$$\text{meanP}=\Sigma w^i p^i$$

where:

- $w^i$ is a gaussian weighting factor that is indirectly proportional to a distance from one of the plurality of remote vehicles to the host vehicle;
- i is one of the plurality of remote vehicles;
- $p^i$ is one of the plurality of remote-vehicle motion parameters for remote vehicle i; and
- meanP is a weighted mean of one of the plurality of remote-vehicle motion parameters.

In an aspect of the present disclosure, the controller is programmed to determine a similarity of each of the plurality of remote-vehicle motion parameters of the plurality of remote vehicles with each of a plurality of host-vehicle motion parameters of the host vehicle using the following equation:

$$Sim_p = \begin{cases} 1, & |p_{rem} - p_{host}| \le \delta \\ 0, & |p_{rem} - p_{host}| > \delta \end{cases}$$

where:

- $Sim_p$ is the similarity between one of the plurality of remote-vehicle motion parameters of the plurality of remote vehicles and a corresponding one of the plurality of host-vehicle motion parameters of the host vehicle;
- $p_{rem}$ is a weighted mean of one of the plurality of remote-vehicle motion parameters;
- $p_{host}$ is a value of one of the plurality of host-vehicle motion parameters; and
- $\delta$ is a threshold value.

In an aspect of the present disclosure, the controller is programmed to quantize the plurality of remote-vehicle motion parameters for each of the plurality of remote vehicles to determine a weighted speed profile for each of the plurality of remote vehicles during the predetermined time interval using a the following equations:

$$\alpha_t=\Sigma w_i \alpha_i;$$

$$m_t=\Sigma w_i m_i \text{ and;}$$

$$b_t=\Sigma w_i b_i$$

where:

- $a_i$ is a number of times that one of the plurality of remote vehicles accelerated during the predetermined time interval;
- i is one of the plurality of remote vehicles;
- $w_i$ is a weighting factor;
- $m_i$ is a number of times that one of the plurality of remote vehicles maintain a speed thereof during the predetermined time interval;
- $b_i$ a number of times that one of the plurality of remote vehicles braked during the predetermined time interval;
- $\alpha_t$ is an acceleration profile of one of the plurality of remote vehicles during the predetermined time interval;
- $m_t$ is a speed-constant profile of each of the plurality of remote vehicles during the predetermined time interval; and
- $b_t$ is a braking profile of each of the plurality of remote vehicles during the predetermined time interval.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
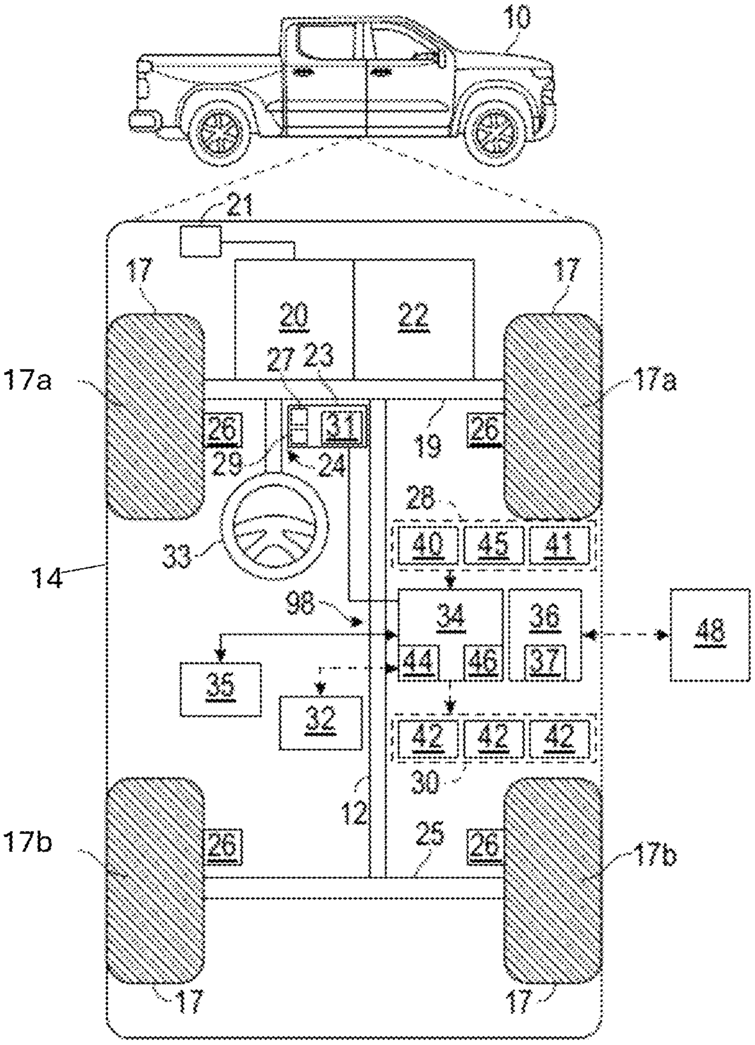
FIG. 1 is a block diagram depicting an embodiment of a host vehicle including a system for validating autonomous vehicle performance using nearby traffic patterns.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a host vehicle 10 generally includes a chassis 12, a body 14, front and rear wheels 17 and may be referred to as a vehicle system. In the depicted embodiment, the host vehicle 10 includes two front wheels 17*a* and two rear wheels 17*b*. The body 14 is arranged on the chassis 12 and substantially encloses components of the host vehicle 10. The body 14 and the chassis 12 may jointly form a frame. The wheels 17 are each rotationally coupled to the chassis 12 near a respective corner of the body 14. The host vehicle 10 includes a front axle 19 coupled to the front wheels 17*a* and a rear axle 25 coupled to the rear wheels 17*b*.

In various embodiments, the host vehicle 10 may be an autonomous vehicle and a system 98 is incorporated into the host vehicle 10. The system 98 may be referred to as the system or the system for validating autonomous vehicle performance using nearby traffic patterns. The host vehicle 10 is, for example, a vehicle that is automatically controlled to carry passengers from one location to another. The host vehicle 10 is depicted in the illustrated embodiment as a pickup truck, but it should be appreciated that other vehicles including, trucks, sedans, coupes, sport utility vehicles (SUVs), recreational vehicles (RVs), etc., may also be used. In an embodiment, the host vehicle 10 may be a so-called a Level Two, a Level Three, Level Four, or Level Five automation system. A Level Four system indicates "high automation," referring to the driving mode-specific performance by an automated driving system of aspects of the dynamic driving task, even if a human driver does not respond appropriately to a request to intervene. A Level Five system indicates "full automation," referring to the full-time performance by an automated driving system of aspects of the dynamic driving task under a number of roadway and environmental conditions that can be managed by a human driver. In Level 3 vehicles, the vehicle systems perform the entire dynamic driving task (DDT) within the area that it is designed to do so. The vehicle operator is only expected to be responsible for the DDT-fallback when the host vehicle 10 essentially "asks" the driver to take over if something goes wrong or the vehicle is about to leave the zone where it is able to operate. In Level 2 vehicles, systems provide steering, brake/acceleration support, lane centering, and adaptive cruise control. However, even if these systems are activated, the vehicle operator at the wheel must be driving and constantly supervising the automated features.

As shown, the host vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an electric machine such as a traction motor and/or a fuel cell propulsion system. The host vehicle 10 may further include a battery (or battery pack) 21 electrically connected to the propulsion system 20. Accordingly, the battery 21 is configured to store electrical energy and to provide electrical energy to the propulsion system 20. In certain embodiments, the propulsion system 20 may include an internal combustion engine and/or an electric motor. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17 and may include a steering wheel 33. While depicted as including a steering wheel 33 for illustrative purposes, in some embodiments contemplated within the scope of the present disclosure, the steering system 24 may not include a steering wheel 33.

The sensor system 28 includes one or more sensors 40 (i.e., sensing devices) that sense observable conditions of the exterior environment and/or the interior environment of the host vehicle 10. The sensors 40 are in communication with the controller 34 and may include, but are not limited to, one or more radars, one or more light detection and ranging (lidar) sensors, one or more proximity sensors, one or more odometers, one or more ground penetrating radar (GPR) sensors, one or more steering angle sensors, one or more global positioning systems (GPS) transceivers 45, one or more tire pressure sensors, one or more cameras 41 (e.g., optical cameras and/or infrared cameras), one or more gyroscopes, one or more accelerometers, one or more inclinometers, one or more speed sensors, one or more ultrasonic sensors, one or more inertial measurement units (IMUs) and/or other sensors. Each sensor 40 is configured to generate a signal that is indicative of the sensed observable conditions of the exterior environment and/or the interior environment of the host vehicle 10. Because the sensor system 28 provides data to the controller 34, the sensor system 28 and its sensors 40 are considered sources of information (or simply sources).

The sensor system 28 includes one or more Global Navigation Satellite System (GNSS) transceivers 45 (e.g., Global Positioning System (GPS) transceivers) configured to detect and monitor the route data (i.e., route information). The GNSS transceiver 45 is configured to communicate with a GNSS to locate the position of the host vehicle 10 in the globe. The GNSS transceiver 45 is in electronic communication with the controller 34.

The actuator system 30 includes one or more actuator devices 42 that control one or more vehicle features such as, but not limited to, the propulsion system 20, the transmission system 22, the steering system 24, and the brake system 26. In various embodiments, the vehicle features may further include interior and/or exterior vehicle features such as, but are not limited to, doors, a trunk, and cabin features such as air, music, lighting, etc.

The data storage device 32 stores data for use in automatically controlling the host vehicle 10. In various embodiments, the data storage device 32 stores defined maps of the navigable environment. In various embodiments, the defined maps may be predefined by and obtained from a remote system. For example, the defined maps may be assembled by the remote system and communicated to the host vehicle 10 (wirelessly and/or in a wired manner) and stored in the data storage device 32. The data storage device 32 may be part of the controller 34, separate from the controller 34, or part of the controller 34 and part of a separate system.

The host vehicle 10 may further include one or more airbags 35 in communication with the controller 34 or another controller of the host vehicle 10. The airbag 35 includes an inflatable bladder and is configured to transition between a stowed configuration and a deployed configuration to cushion the effects of an external force applied to the host vehicle 10. The sensors 40 may include an airbag sensor, such as an IMU, configured to detect an external force and generate a signal indicative of the magnitude of such external force. The controller 34 is configured to command the airbag 35 to deploy based on the signal from one or more sensors 40, such as the airbag sensor. Accordingly, the controller 34 is configured to determine when the airbag 35 has been deployed.

The controller 34 includes at least one processor 44 and a non-transitory computer readable storage device or media 46. The processor 44 may be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the host vehicle 10. The controller 34 of the host vehicle 10 may be referred to as a vehicle controller and may be programmed to execute a method 100 as described in detail below.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the host vehicle 10, and generate control signals to the actuator system 30 to automatically control the components of the host vehicle 10 based on the logic, calculations, methods, and/or algorithms. Although a single controller 34 is shown in FIG. 1, embodiments of the host vehicle 10 may include a plurality of controllers 34 that communicate over a suitable communication medium or a combination of communication mediums and that cooperate to process the sensor signals, perform logic, calculations, methods, and/or algorithms, and generate control signals to automatically control features of the host vehicle 10.

In various embodiments, one or more instructions of the controller 34 are embodied in the system 98. The host vehicle 10 includes a user interface 23, which may be a touchscreen in the dashboard. The user interface 23 may include, but is not limited to, an alarm, such as one or more speakers 27 to provide an audible sound, haptic feedback in a vehicle seat or other object, one or more displays 29, one or more microphones 31 and/or other devices suitable to provide a notification to the vehicle user of the host vehicle 10. The user interface 23 is in electronic communication with the controller 34 and is configured to receive inputs by a user (e.g., a vehicle operator or a vehicle passenger). For example, the user interface 23 may include a touch screen and/or buttons configured to receive inputs from a vehicle user 11 (FIG. 6). Accordingly, the controller 34 is configured to receive inputs from the user via the user interface 23.

The host vehicle 10 may include one or more displays 29 configured to display information to the user (e.g., vehicle operator or passenger). In certain embodiments, the display 29 may be configured as a head-up display (HUD), and/or an information cluster display.

The communication system 36 is in communication with the controller 34 and is configured to wirelessly communicate information to and from other objects 48, such as but not limited to, other vehicles ("V2V" communication), infrastructure ("V2I" communication), remote systems at a remote call center (e.g., ON-STAR by GENERAL MOTORS) and/or personal electronic devices, such as a mobile phone. In certain embodiments, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or communication transceivers 37 for receiving and/or transmitting signals, such as cooperative sensing messages (CSMs). The communication transceivers 37 may be considered sensors 40 or sources of information. The communication system 36 is configured to wirelessly communicate information between the host vehicle 10 and another vehicle. Further, the communication system 36 is configured to wirelessly communicate information between the host vehicle 10 and infrastructure or other vehicles.

Figure 2:
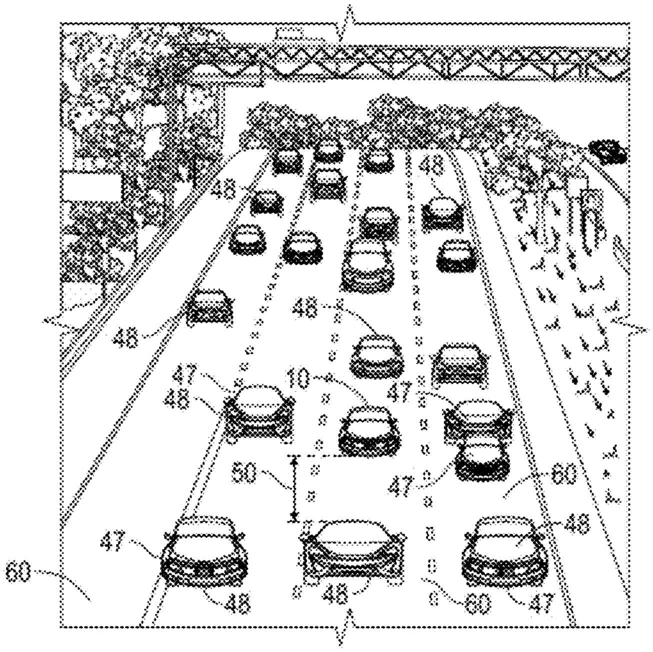
FIG. 2 is a perspective view of the host vehicle of FIG. 1 and a plurality of remote vehicles near the host vehicle.

With reference to FIGS. 1 and 2, the system 98 is configured to validate the autonomous driving performance of the host vehicle 10. Validating autonomous driving performance is a very challenging task. Besides the long-tail problem (i.e., large number of corner cases), another problem is the lack of ground truth. This is mainly because in most driving scenarios, there might exist many equally good decisions/plans. Therefore, it is challenging to define which one is the ground truth that should be used for validating autonomous driving system performance. The presently disclosed system 98 and method 100 (FIG. 3) may be used to validate autonomous driving performance. In most autonomous driving scenarios, the behavior of the host vehicle 10 should be consistent with the rest in the traffic flow. Therefore, the overall surrounding traffic flow patterns are used as the ground truth to validate the autonomous driving performance of the host vehicle 10.

As shown in FIG. 2, the host vehicle 10 may be surrounded by one or more objects 48. Some of these objects 48 may be remote vehicles 47 located at a predetermined distance from the host vehicle 10. In other words, the distance 50 from host vehicle 10 to these remote vehicles 47 is equal to or less than the predetermined distance 50. The distance 50 may be measured in units of length, such as meters, or in number of lanes 60, or using another suitable method. In the present disclosure, the system 98 uses the traffic pattern of the remote vehicles 47 that are located within the predetermined distance from the host vehicle 10 during a predetermined time interval to validate the autonomous driving performance. In the present disclosure, the term "traffic pattern" means a pattern of current, past, and predicted movements of a group of remote vehicles 47 that are located within the predetermined distance from the host vehicle 10 during a predetermined time interval. The predetermined distance may be determined by testing the host vehicle 10 in traffic. As a non-limiting example, the predetermined distance 50 may be six meters to allow the system 98 to consider the traffic pattern of remote vehicles 47 in lanes directly adjacent to the lane in which the host vehicle 10 is located. It is envisioned, however, that the predetermined distance may be less than or greater than six meters. The predetermined time interval may be determined by testing the host vehicle and may be determined in second, minutes, or another suitable measurement of time. As a non-limiting example, the predetermined time interval may four minutes to provide the system 98 with enough time to sense the movements of the remote vehicles 47 that are located within the predetermined distance from the host vehicle 10. Regardless of the value of the predetermined time interval, the controller 34 of the system 98 is specifically programmed to execute the method 100 to validate the autonomous driving performance of the host vehicle 10.

Figure 3:
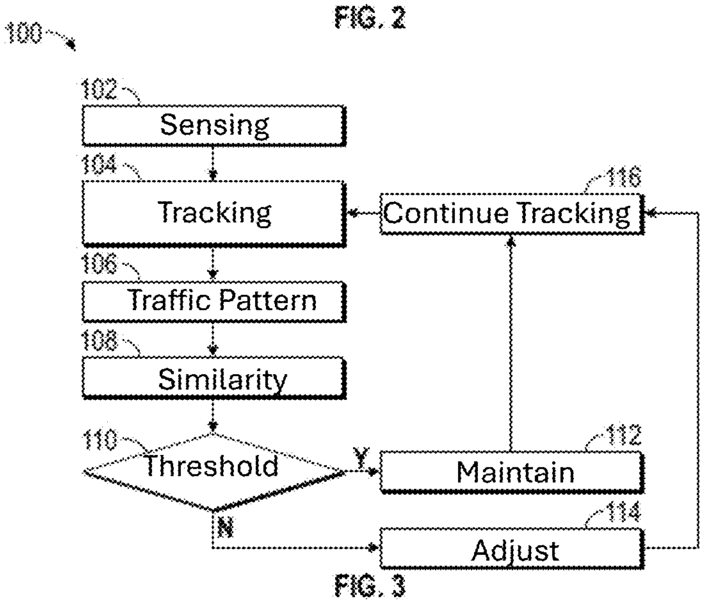
FIG. 3 is a flowchart of a method for validating autonomous vehicle performance using nearby traffic patterns.

With reference to FIG. 3, the method 100 begins at block 102. Block 102 entails sensing the objects 48 surrounding the host vehicle 10 using one or more one or more sensors 40 (e.g., camera 41, lidar sensor) and/or data received from one or more objects 48 via one or more communication transceivers 37. This sensor data collected by the sensors 40 or received by the communication transceivers 37 is transmitted to the controller 34 of the host vehicle 10 and may referred to as remote-vehicle data because it includes data about the remote vehicles 47 surrounding the host vehicle 10. Therefore, at block 102, the controller 34 receives remote vehicle data. In the present disclosure, the term "remote vehicle" means a vehicle that is located at a distance from the host vehicle 10 that is equal to or less than the predetermined distance 50. Then, the method 100 proceeds to block 104.

At block 104, using one or more sensors 40 (e.g., camera 41, lidar sensor) in the host vehicle 10 and/or data received from one or more objects 48 via one or more communication transceivers 37, the controller 34 identifies and tracks the objects 48 that are located within the predetermined distance 50 from the host vehicle 10. The objects 48 that are located within the predetermined distance 50 from the host vehicle 10 may be considered remote vehicles 47 or relevant objects. Accordingly, at block 104, the controller 34 identifies and tracks the remote vehicles 47 using remote vehicle data. For each identified object 48 that is located within the predetermined distance 50 from the host vehicle 10 (i.e., the remote vehicle 47), the controller 34 determines (e.g., estimate) one or more parameters during the predetermined time interval. These parameters are part of the remote vehicle data and may include, but are not limited, to object identification number, class, observed trajectory, predicted trajectory, longitudinal velocity profile during the predetermined time interval, lateral velocity profile during the predetermined time interval, angular velocity profile during the predetermined time interval, average longitudinal velocity during the predetermined time interval, average lateral velocity during the predetermined time interval, and/or average angular velocity during the predetermined time interval. The parameters may include remote-vehicle motion parameters. As used herein, the term "remote-vehicle motion parameter" means a parameter about a movement of the remote vehicles 47 that are located within the predetermined distance 50 from the host vehicle 10 during the predetermined time interval. As non-limiting examples, the remote-vehicle motion parameters are part of the remote vehicle data and may include, but are not limited to, observed trajectory, predicted trajectory, longitudinal velocity profile during the predetermined time interval, lateral velocity profile during the predetermined time interval, angular velocity profile during the predetermined time interval, average longitudinal velocity during the predetermined time interval, average lateral velocity during the predetermined time interval, and/or average angular velocity during the predetermined time interval. The method 100 then proceeds to block 106.

At block 106, the controller 34 uses the remote data to determine the traffic pattern of the remote vehicles 47 that are located within the predetermined distance 50 from the host vehicle 10. As used herein, the term "traffic pattern" means a pattern of current, past and predicted movements of a group of remote vehicles 47 that are located within the predetermined distance from the host vehicle 10 during a predetermined time interval. Thus, the controller 34 determines the traffic pattern of the remote vehicles 47 that are located within the predetermined distance 50 from the host vehicle 10 using one or more remote-vehicle motion parameters. The traffic pattern may be described as the statistics of the parameters (e.g., remote-vehicle motion parameters) of the objects 48 that belong to a class of interest (e.g., remote vehicles 47 that are located within the predetermined distance 50 from the host vehicle during the predetermined time interval). For example, for the vehicle class, as part of determining the traffic pattern, the controller 34 determines (e.g., calculates) as a weighted mean for each of the remote-vehicle motion parameters.

After executing block 106, the method 100 proceeds to block 108.

At block 108, the controller 34 determines (e.g., calculates) the similarity between the traffic pattern of the remote vehicles 47 and the movements of the host vehicle 10. In the present disclosure, the term "similarity" means how close the value of a remote-vehicle motion parameter is to the value of a host-vehicle motion parameter of the same parameter class. As discussed above, the parameter classes for the host-vehicle motion parameter and the remote-vehicle motion parameters may be, but are not limited to, an observed trajectory, predicted trajectory, longitudinal velocity profile during the predetermined time interval, lateral velocity profile during the predetermined time interval, angular velocity profile during the predetermined time interval, average longitudinal velocity during the predetermined time interval, average lateral velocity during the predetermined time interval, and/or average angular velocity during the predetermined time interval. The term "host-vehicle motion parameter" means a parameter about a movement of the host vehicle 10 during the predetermined time interval.

To the determine the similarity between the between the traffic pattern of the remote vehicles 47 and the movements of the host vehicle 10, the controller 34 may determine the similarity between each of the remote-vehicle motion parameters and each of corresponding host-vehicle motion parameters using the following equation:

$$Sim_p = \begin{cases} 1, & |p_{rem} - p_{host}| \le \delta \\ 0, & |p_{rem} - p_{host}| > \delta \end{cases}$$

where:

$Sim_p$ is the similarity between one of the remote-vehicle motion parameters of the remote vehicles 47 and the corresponding one of the host-vehicle motion parameters of the host vehicle 10;

$p_{rem}$ is the weighted mean of one of the plurality of remote-vehicle motion parameters;

$p_{host}$ is a value of one of the host-vehicle motion parameters;

$\delta$ is a threshold value.

Then, the controller 34 determines (e.g., calculates) the similarity between the traffic pattern of the remote vehicles 47 and the movements of the host vehicle 10 using the following equation:

$$sim = \Sigma w_i sim_i$$

where:

$sim_i$ is a similarity between one of the plurality of remote-vehicle motion parameters of a parameter class i and one of the plurality of host-vehicle motion parameters of the parameter class i; and $w_i$ is a weighting factor for the parameter class i.

The method 100 then proceeds to block 110.

At block 110, the controller 34 determines whether the similarity between the traffic pattern of the plurality of remote vehicles 47 and the movements of the host vehicle 10 is less than a predetermined threshold. The value of the predetermined threshold may be obtained by testing the host vehicle 10. If the similarity between the traffic pattern of the remote vehicles 47 and the movements of the host vehicle 10 is equal to or greater than the predetermined threshold, then the method 100 proceeds to block 112. If the similarity between the traffic pattern of the remote vehicles 47 and the movements of the host vehicle 10 is less than the predetermined threshold, then the method 100 proceeds to block 114.

At block 112, the controller 34 flags the movements of the host vehicle 10 as normal, and the controller 34 command the host vehicle 10 to maintain its current autonomous driving behavior.

At block 114, the controller 34 flags the movements of the host vehicle 10 as abnormal and commands the host vehicle 10 to adjust its movements according to the traffic pattern. In other words, the controller 34 commands the host vehicle 10 to adjust its movements to match the traffic pattern of the remote vehicles 47 that are located within the predetermined distance 50 from the host vehicle 10. After executing either block 112 or block 114, the method 100 proceeds to block 116.

At block 116, the controller 34 commands the sensors 40 (and/or communication system 36) to continue tracking objects 48 that are located within the predetermined distance 50 from the host vehicle 10. Then, the method 100 returns to block 104.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for validating an autonomous vehicle performance using nearby traffic patterns, comprising:

receiving remote vehicle data, wherein the remote vehicle data includes at least one remote-vehicle motion parameter about a movement of each of a plurality of remote vehicles during a predetermined time interval, and each of the plurality of remote vehicles is located at a predetermined distance from a host vehicle;

determining a traffic pattern of the plurality of remote vehicles using the at least one remote-vehicle motion parameter of each of the plurality of remote vehicles during the predetermined time interval;

determining a similarity between the traffic pattern of the plurality of remote vehicles and movements of the host vehicle;

determining whether the similarity between the traffic pattern of the plurality of remote vehicles and the movements of the host vehicle is less than a predetermined threshold;

in response to determining that the similarity between the traffic pattern of the plurality of remote vehicles and the movements of the host vehicle is less than the predetermined threshold, commanding the host vehicle to adjust the movements thereof to match the traffic pattern of the plurality of remote vehicles;

wherein the similarity between the traffic pattern of the plurality of remote vehicles and the movements of the host vehicle is how close a value of a remote-vehicle motion parameter is to a value of a host-vehicle motion parameter of a same parameter class;

wherein the same parameter class includes an angular velocity profile during the predetermined time interval.

2. The method of claim 1, further comprising sensing objects around the host vehicle.

3. The method of claim 2, further comprising identifying the objects that were previously sensed and that are located at the predetermined distance from the host vehicle during the predetermined time interval.

4. The method of claim 3, further comprising tracking the objects that were previously sensed and that are located at the predetermined distance from the host vehicle during the predetermined time interval.

5. The method of claim 4, further comprising determining object parameters for each of the objects that are being tracked, wherein the object parameters include an object identification number, an observed trajectory, a class, a predicted trajectory, a longitudinal velocity profile during the predetermined time interval, a lateral velocity profile during the predetermined time interval, an angular velocity profile during the predetermined time interval, an average longitudinal velocity during the predetermined time interval, an average lateral velocity during the predetermined time interval, and an average angular velocity during the predetermined time interval, and the class includes a pedestrian, a motor vehicle, and infrastructure.

6. The method of claim 5, wherein the at least one remote-vehicle motion parameter is one of a plurality of remote-vehicle motion parameters, the plurality of remote-vehicle motion parameters include the longitudinal velocity profile during the predetermined time interval of each of the plurality of remote vehicles, the lateral velocity profile during the predetermined time interval of each of the plurality of remote vehicles, the angular velocity profile during the predetermined time interval of each of the plurality of remote vehicles, the average longitudinal velocity during the predetermined time interval, the average lateral velocity during the predetermined time interval of each of the plurality of remote vehicles, and the average angular velocity during the predetermined time interval.

7. The method of claim 6, wherein determining the similarity between the traffic pattern of the plurality of remote vehicles and movements of the host vehicle includes quantizing the plurality of remote-vehicle motion parameters for each of the plurality of remote vehicles.

8. The method of claim 1, wherein the at least one remote-vehicle motion parameter is one of a plurality of remote-vehicle motion parameters, and quantizing the plurality of remote-vehicle motion parameters for each of the plurality of remote vehicles to determine a weighted speed profile for each of the plurality of remote vehicles during the predetermined time interval using the following equations:

$$\alpha_t=\Sigma w_i a_i;$$

$$m_t=\Sigma w_i m_i \text{ and;}$$

$$b_t=\Sigma w_i b_i$$

where:

$a_i$ is the number of times that one of the plurality of remote vehicles accelerated during the predetermined time interval;

i is one of the plurality of remote vehicles;

$w_i$ is a weighting factor;

$m_i$ is the number of times that one of the plurality of remote vehicles maintain a speed thereof during the predetermined time interval;

$b_i$ the number of times that one of the plurality of remote vehicles braked during the predetermined time interval;

$\alpha_t$ is an acceleration profile from the plurality of remote vehicles during the predetermined time interval;

$m_t$ is a speed-constant profile from the plurality of remote vehicles during the predetermined time interval; and $b_t$ is a braking profile from the plurality of remote vehicles during the predetermined time interval.

9. The method of claim 8, wherein determining whether the similarity between the traffic pattern of the plurality of remote vehicles and the movements of the host vehicle is less than a predetermined threshold includes determining the similarity between the plurality of remote-vehicle motion parameters of the plurality of remote vehicles and a plurality of host-vehicle motion parameters of the host vehicle using a following equation:

$$sim=\Sigma w_i sim_i$$

where:

$sim_i$ is a similarity between one of the plurality of remote-vehicle motion parameters of a parameter class i and one of the plurality of host-vehicle motion parameters of the parameter class i; and $w_i$ is a weighting factor for the parameter class i.

10. A system for validating an autonomous vehicle performance using nearby traffic patterns, comprising:

a plurality of sensors;

a controller in communication with the plurality of sensors, wherein the controller is programmed to:

receive remote vehicle data from the plurality of sensors, wherein the remote vehicle data includes at least one remote-vehicle motion parameter about a movement of each of a plurality of remote vehicles during a predetermined time interval, and each of the plurality of remote vehicles is located at a predetermined distance from a host vehicle, and the at least one remote-vehicle motion parameter is one of a plurality of remote-vehicle motion parameters;

determine a traffic pattern of the plurality of remote vehicles using the at least one remote-vehicle motion parameter of each of the plurality of remote vehicles during the predetermined time interval;

determine a similarity between the traffic pattern of the plurality of remote vehicles and movements of the host vehicle;

determine whether the similarity between the traffic pattern of the plurality of remote vehicles and the movements of the host vehicle is less than a predetermined threshold; and in response to determining that the similarity between the traffic pattern of the plurality of remote vehicles and the movements of the host vehicle is less than the predetermined threshold, command the host vehicle to adjust the movements thereof to match the traffic pattern of the plurality of remote vehicles;

wherein the similarity between the traffic pattern of the plurality of remote vehicles and the movements of the host vehicle is how close a value of the at least one remote-vehicle motion parameter is to a value of a host-vehicle motion parameter of a same parameter class;

wherein the same parameter class includes an average angular velocity profile from the plurality of the remote vehicles during the predetermined time interval, a longitudinal velocity profile from the plurality of remote vehicles during the predetermined time interval, a lateral velocity profile from the plurality of remote vehicles during the predetermined time interval, an average longitudinal velocity from the plurality of remote vehicles during the predetermined time interval, and an average lateral velocity from the plurality of remote vehicles during the predetermined time interval;

wherein the similarity between the traffic pattern of the plurality of remote vehicles and the movements of the host vehicle depends on the average angular velocity profile from the plurality of the remote vehicles during the predetermined time interval, the longitudinal velocity profile from the plurality of remote vehicles during the predetermined time interval, the lateral velocity profile from the plurality of remote vehicles during the predetermined time interval, the average longitudinal velocity from the plurality of remote vehicles during the predetermined time interval, and the average lateral velocity from the plurality of remote vehicles during the predetermined time interval.

11. The system of claim 10, wherein each of the plurality of sensors is configured to sense objects around the host vehicle.

12. The system of claim 11, wherein the controller is configured to identify the objects that were previously sensed and that are located at the predetermined distance from the host vehicle during the predetermined time interval.

13. The system of claim 12, wherein the controller is configured to track the objects that were previously sensed and that are located at the predetermined distance from the host vehicle during the predetermined time interval, the predetermined distance is six meters, and the predetermined time interval is four minutes.

14. The system of claim 13, wherein the controller is programed to determine object parameters for each of the objects that are being tracked, wherein the object parameters include an object identification number, an observed trajectory, a class, a predicted trajectory, and the class includes a pedestrian, a motor vehicle, and infrastructure.

15. The system of claim 14, wherein the controller is programmed to determine a weighted mean of each of the plurality of remote-vehicle motion parameters for each of the plurality of remote vehicles using the following equation:

$$\text{meanP}=\Sigma w^i p^i$$

where:

$w^i$ is a gaussian weighting factor that is indirectly proportional to a distance from one of the plurality of remote vehicles to the host vehicle;

i is one of the plurality of remote vehicles; and $p^i$ is one of the plurality of remote-vehicle motion parameters; and meanP is a weighted mean of one of the plurality of remote-vehicle motion parameters.

16. The system of claim 15, wherein the controller is programmed to determine a similarity of each of the plurality of remote-vehicle motion parameters of the plurality of remote vehicles with each of a plurality of host-vehicle motion parameters of the host vehicle using the following equation:

$$Sim_p = \begin{cases} 1, & |p_{rem} - p_{host}| \le \delta \\ 0, & |p_{rem} - p_{host}| > \delta \end{cases}$$

where:

$Sim_p$ is the similarity between one of the plurality of remote-vehicle motion parameters of the plurality of remote vehicles and a corresponding one of the plurality of host-vehicle motion parameters of the host vehicle;

$p_{rem}$ is a weighted mean of one of the plurality of remote-vehicle motion parameters;

$p_{host}$ is a value of one of the plurality of host-vehicle motion parameters; and δ is a threshold value.

* * * * *